July 3, 1962 G. N. WEST 3,042,178

CARRIAGE CONTROL

Filed Oct. 2, 1959 2 Sheets-Sheet 1

INVENTOR
GERALD N. WEST

BY Maurice H. Klitzman
ATTORNEY 3,042,178

CARRIAGE CONTROL

Gerald N. West, Endwell, N.Y., assignor to International Business Machines Corporation, New York, N.Y., a corporation of New York Filed Oct. 2, 1959, Ser. No. 844,090
10 Claims. (Cl. 197—133)

Figure 1:
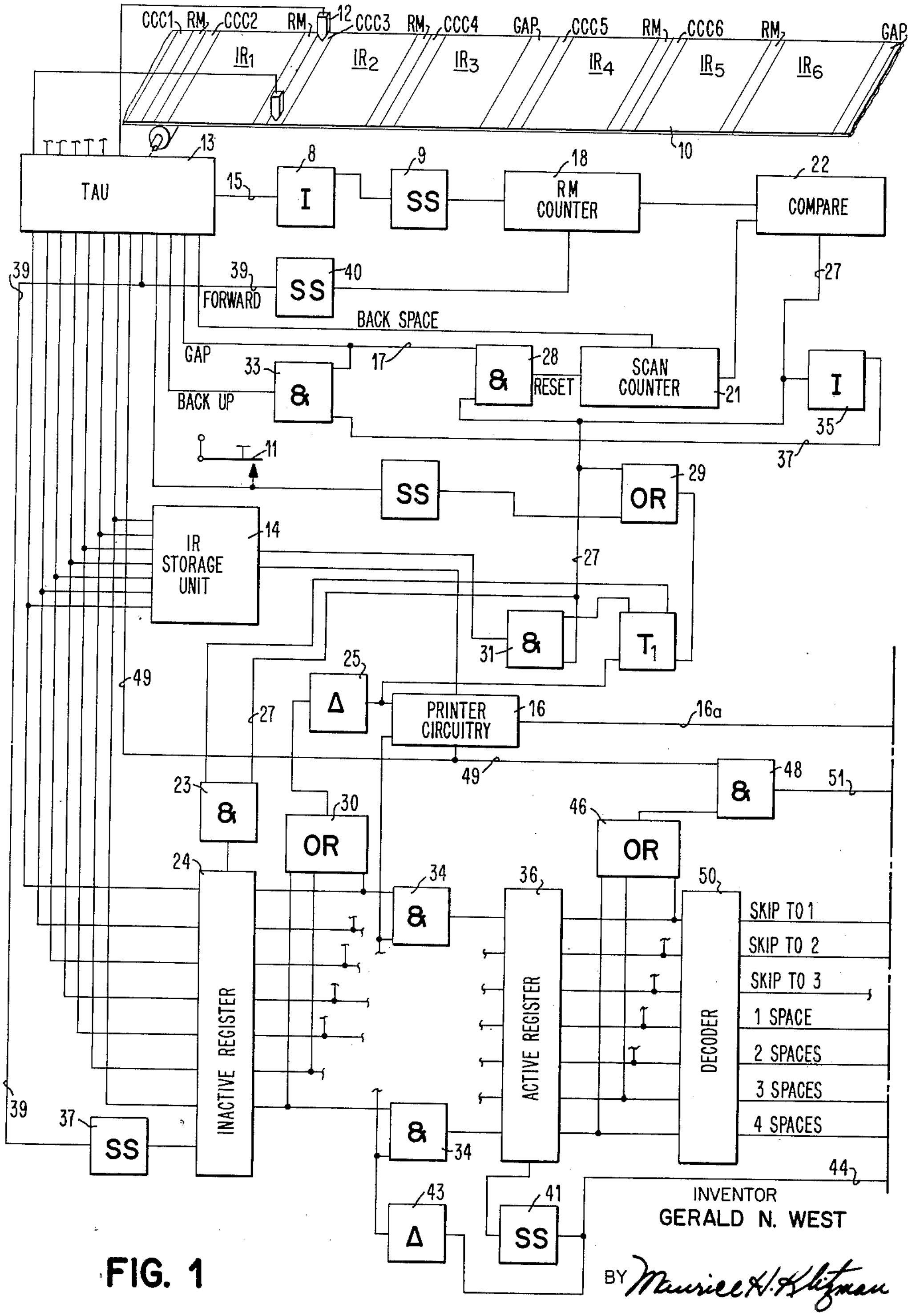

This invention relates to a carriage control for use in controlling the feeding of business paper forms in an accounting machine, and, in particular to an arrangement for speeding up the over-all operation of moving the carriage, the forms and printing recorded information on the forms.

In order to print recorded information from a magnetic tape onto a business form, it is the general practice to sense the recorded information with a related carriage control character which indicates where the recorded information is to be printed on the form. Due to the time required for sensing and carriage motion for printing, some means is required to make them as coincident as possible. Therefore, it has been the practice to provide buffer storage for the carriage control character and the record information to be printed on the forms. Thereafter, the carriage control character is gated into a carriage control register, and, through a decoding device, controls movement of the carriage. When the carriage has been moved to its next printing position as indicated by the carriage control character, the related record information in the buffer storage is gated into a printing mechanism to be printed on the form. Therefore, a large amount of storage capacity is required by the system to retain this information sensed.

Magnetic tape is generally constructed with groups of records of recorded data with gaps in between each group. The gap indicates the end of a group of records, for example, 15 records. Although it may be desirable in some respects to provide a gap at the end of each record to make it more like a unit record, the loss in unused tape and acceleration problems in starting and stopping the tape after each record make it impractical. The arrangement of the records in groups not only requires a large amount of storage capacity as mentioned above, but a considerable amount of time is lost since it is necessary to suppress carriage motion until the first carriage control character of the next record after the gap has been read.

It is therefore an object of this invention to provide a carriage control arrangement which results in an increase of speed in transposing recorded information to business forms.

It is another object of this invention to provide a carriage control which will increase the output of a business forms printing machine by moving the carriage during reading of the first record in a group of records following a gap.

It is still another object of this invention to provide read means for a carriage control wherein during scanning of a group of records, a single record is read and stored together with an unrelated carriage control character.

Briefly stated, and in accordance with one aspect of this invention, a carriage control is provided which calls for a carriage control character and unrelated recorded information wherein the carriage control character is related to a subsequent record. Also, in accordance with another aspect of the invention a magnetic tape is provided which contains several groups of records, each group being separated by a gap, with the tape being shuttled back and forth through a group of records between two gaps, and read means for reading a single record at a time with an unrelated carriage control character. The carriage control includes inactive and active registers in order to store the carriage control character, which is not related to the recorded information being called for, to enable the carriage to be moved immediately after a print line is completed while the next recorded information to be printed is being transported to the sensing device, and thereby increase the output speed of printing on business forms. In accordance with still another aspect of the invention, a gating circuit is provided which is selectively operated to permit entrance of a carriage control character into an inactive register, and, immediately upon read-in of the carriage control character, the gate is turned off to prevent the entrance of following information until the register is cleared and the next carriage control character is called for.

The foregoing and other objects, features and advantages of the invention will be apparent from the following more particular description of a preferred embodiment of the invention, as illustrated in the accompanying drawings.

FIG. 1 is a view showing a novel sequence of recorded information on magnetic tape and the manner in which the carriage control character and recorded data is processed.

Figure 1A:
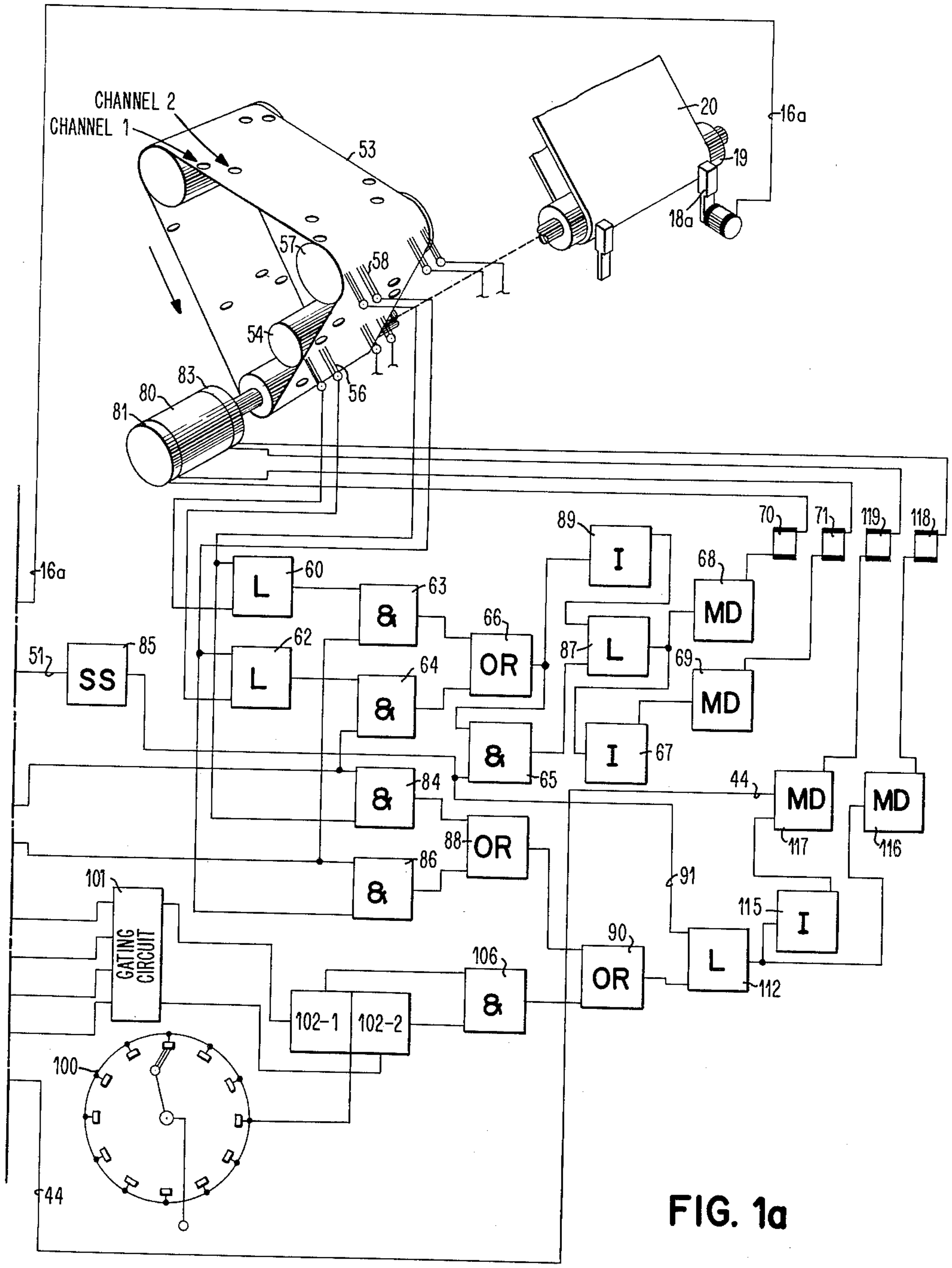

FIG. 1*a* is a view showing how the tape is shuttled and the carriage control character is selected, and, also, how the carriage control character is utilized to start and stop the carriage.

Referring to FIG. 1, the numeral 10 generally refers to a magnetic tape showing groups of records. A tape may consist of several groups of such records although for purposes of describing this invention only two groups are shown with three records each. The tape also contains a carriage control character hereinafter referred to as CCC which indicates the type of motion to be accomplished by the carriage and the location of the next printing line where the data is to be recorded; a record information portion which is the data to be printed on the line called for by a CCC, hereinafter referred to as IR; and a record mark portion hereinafter referred to as RM which is a means of indicating the end of an information record IR. A gap in the tape indicates the end of a group of records. Therefore a record is intended to cover an IR, a CCC and an RM.

Now the magnetic tape is preferably prepared with a CCC arranged adjacent unrelated recorded data so that it can be read with the unrelated recorded data. For example, $CCC_3$ is read with $IR_2$, yet is unrelated to $IR_2$. It is significant to note that at the end record of a group of records, the end of which is indicated by a gap, a CCC is included which relates to the first record in the next group which follows the gap. For example, $CCC_4$ relates to $IR_4$ which follows the gap. The first $CCC_1$ for the first record $IR_1$ is a special case hereinafter described more fully.

The CCC is stored when read with unrelated data, and carriage motion is initiated immediately upon completion of printing the unrelated data which permits the carriage to be moved simultaneously with reading of the next IR related to that CCC. Thus tape acceleration time and tape movement time to the desired record is not added to carriage movement time.

In order to pick up the recorded data on the tape, heads 12 are shown. It is generally the practice to use seven heads to correspond with a similar number of tracks on a magnetic tape. However it is recognized that any number of heads corresponding to the number of tracks could be used. The information picked up by the reading heads 12 in the form of weak pulses is transferred to a tape adapter unit 13 which amplifies and shapes the pulses to make them usable in the system. Also the tape adapter unit contains a drive system for driving the magnetic tape.

The adapter unit 13 also contains means for detecting the absence of recorded information for a given period of time which exceeds the normal spacing between characters. This relatively long time interval will be hereinafter referred to as a gap and means in tape adapter unit 13 for detecting the gap will be referred to as a gap detector. The adapter unit also contains a detector for a record mark which is coded information following the last character of each IR. However it is noted that just prior to a gap an RM does not appear. Since such detecting means are well known in the art, and form no part of the invention, further description is not deemed necessary. It is noted that although the record mark detector has been described as being in the tape adapter unit, it could also be in other units such as storage unit 14, so long as it is in the data path.

Now in order to start the machine, a start switch 11 is provided. Momentary depression of this start switch activates the tape adapter unit and its drive mechanism. The start switch also provides a signal to trigger $T_1$ to turn it to state "1" so as to condition inactive register 24 to accept $CCC_1$ as will hereinafter be more fully explained. The drive mechanism is arranged to drive the tape forward or backward. The adapter also provides certain signals it receives from the tape to control circuits which select the appropriate record. The signals represent either a gap or record mark. The carriage control character and recorded data go directly to other circuits.

In order to shuttle the tape forward and backward and to select one record at a time during each forward motion, record selection control circuits are provided. These control circuits are responsive to the record mark signal on line 15 and gap signals on line 17. The record selection control circuits include two counters, one a record mark counter 18 which counts the number of record marks as the tape moves forward, and a scan counter 21 which advances one count at the end of each scan. It is noted that the record mark counter is reset to 1 at the beginning of a scan. The scan counter is reset to 1 at the beginning of the first scan of each group of records. A comparing circuit 22 is provided to compare the two counters and provide an output when the two counters contain the same count.

The output of the comparing circuits 22 on line 27 conditions one leg of AND circuit 28. The other leg of AND circuit 28 will be conditioned when a gap at the end of a group of records is detected bringing up line 17. The output of AND circuit 28 will reset the scan counter to a count of 1. Also, the output of comparing circuits 22 on line 27 brings up OR circuit 29 to turn trigger $T_1$ to its "1" state. This brings up one leg of AND circuit 23. The other leg of AND circuit 23 is also conditioned by the pulse on line 27. The output of AND 23 conditions the inactive register 24 to accept the CCC when it appears on the data lines.

Now, in order to turn trigger $T_1$ to its "0" state, to prevent recorded data IR from entering the inactive register 24, an OR circuit 30 is provided which is responsive to the output signal from inactive register 24. OR circuit 30 has an output to a delay circuit 25 which provides sufficient delay to allow the entry of the carriage control character into the inactive register to be completed. The line to $T_1$ from the delay 25 then turns $T_1$ to its "0" state. This then gates off AND circuit 23 to prevent any unwanted information from entering the inactive register. Trigger $T_1$ now being in its "0" state provides an output to condition one leg of AND circuit 31. The other leg of AND circuit 31 is conditioned by the output of the comparing circuit on line 27. The output of AND circuit 31 conditions information record storage 14 to accept IR data until the next record mark is encountered. Sensing the next record mark produces a pulse on line 15 to advance record mark counter 18 one count through inverter 8 and single shot multivibrator 9. Therefore, the count in the record mark counter 18 no longer equals the count in scan counter 21. This brings down the output on line 27 from the comparing unit thus bringing down AND circuit 31 suppressing entry of further IR data into the storage unit 14.

It is preferable for purposes of this invention to use an arrangement which permits the tape to be shuttled back and forth between gaps a sufficient number of times to sequentially read all of the records in a group. This is accomplished by reversing the tape drive upon detecting a gap preceding and following a group of records. (It is noted that when the last record of a group is sensed, means are provided to prevent reversal which will be hereinafter explained.) Assuming the tape is moving in a forward direction and any other than the last IR record has been read, the gap detecting circuits in the tape adapter circuit 13 will cause line 17 to come up stopping the tape and conditioning one side of AND circuit 33. At this time there is no output from comparing circuit on line 27. Therefore an output does appear from inverter 35 on line 37 thereby conditioning the other side of AND circuit 33. The output of AND circuit 33 produces a signal to the tape adapter unit to cause the tape drive to reverse the tape. Now the tape will run in this direction until the gap preceding this group is detected at which time the tape adapter unit circuits stop the tape and await a signal from the printer circuits on line 49 which in conjunction with tape adapter circuitry will provide a forward signal on line 39. This signal passing through a single shot multivibrator 40 causes the RM counter 18 to be reset to a count of 1.

Now, assuming that the last record of a group has just been read, a record mark pulse will not appear on line 15 since the tape 10 is arranged so that a record mark is not recorded after the last record of the group. Therefore, the record mark counter 18 and scan counter 21 contain the same count when the gap is detected. Therefore, inverter 35 does not provide an output to AND circuit 33 to cause reversal. Rather, the tape on signal from line 49 will be driven in the forward direction from this gap initiating the reading of the next group of records.

It was noted previously that a CCC was preferably adjacent an unrelated IR. Also, in order to save time, a CCC appears adjacent the last record of a group that relates to the IR in the next group following the gap. However, no group of records is read previous to the first group and no CCC for $IR_1$ could have been previously stored. Therefore, since a form is started normally at an arbitrary position, which is not necessarily the proper position for the first line of print, a CCC for $IR_1$ is inserted at the start of the first group as a record in itself followed immediately by an RM and then $CCC_2$. In order to properly start the tape, the $CCC_1$ is read into the inactive register 24 as previously described. Since the driver 117 is normally on to suppress carriage drive, line 44 is up, and thus one leg of AND circuit 34 is conditioned so that $CCC_1$ will pass immediately through the AND circuits 34 into active register 36. It is noted that $CCC_2$ will not enter the inactive register after $CCC_1$ since the sensing of the RM following $CCC_1$ brings up line 15, and inverter 8 will produce an output when this pulse is terminated to activate single shot multivibrator 9 producing a pulse to advance the record mark counter to a count of 2. The scan counter 21 remains at a count of 1 throughout the first forward motion of the tape. Therefore, since counters 18 and 21 do not contain the same count, compare circuit 22 will not have an output on line 27. Therefore one leg of AND circuit 23 will be down so as not to condition inactive register 24 when $CCC_2$ or any of the other CCC of the group pass the reading heads throughout the first scan. Also since the compare circuit does not have an output, AND circuit 31 will not have an output to condition the IR storage unit 14. Therefore no IR data is stored during the first scan.

Now in order to transfer the recorded information out of storage 14 into the print mechanism for printing on the forms 20, a printer circuit 16 is provided which contains circuits for switching the stored information at predetermined times to selectively operate, over line 16*a*, the various print hammers of a print mechanism 18*a*.

Now in order to start moving the carriage to the next print line, the printer circuitry 16 emits a pulse after the printing of a line is completed which brings up line 49 so as to condition one side of AND circuit 48. The other side of AND circuit 48 is conditioned by any signal that may be stored in the active register 36. The output of AND circuit 48 comes up to provide a signal to start carriage motion (line 51), the details of which will be hereinafter described more fully.

In addition, a signal on line 49, which indicates the end of a print line, activates the tape adapter unit 13 so as to cause the tape to advance through the group of records to permit sensing of the next record.

Now the output of AND circuit 48 tells the carriage to start moving along with the paper control tape. When the carriage stops at the next print line, a signal will appear on line 44 to reset active register 36 through a single shot multivibrator 41 and, through a delay 43, condition AND circuits 34 to transfer the carriage control character information from the inactive register 24 to the active register 36. As soon as the information enters the active register 36, it enters carriage decoder 50.

Now as previously noted when a signal is obtained on line 49 when printing is completed, and the tape adapter unit is activated to move the magnetic tape 10 again, AND circuit 48 is simultaneously activated to provide a signal on line 51 (FIG. 1*a*) and line 91 through single shot multivibrator 85 to activate latch 112 so as to start moving the carriage. When latch 112 is on, driver 116 is activated which brings up magnet 118 to turn on a valve to hydraulic motor 80 so as to move both the carriage control tape 53 and the carriage 19 for the continuous forms.

Now in order to indicate whether the carriage should operate at a fast speed or a slow speed various circuits can be provided. However for purposes of this invention it is preferred to utilize slow speed signal brushes 56 and stop signal brushes 58 which cooperate with contact rolls 54 and 57 respectively. Now whenever a hole in the tape 53 passes stop brushes 58, latch 60 will be turned on. However when a hole in the tape passes low speed brushes 56, latch 60 will be turned off. Since the tape has as many channels as there are outputs on the carriage decoder 50, there are as many pairs of brushes, 56 and 58, as there are channels on the tape. The output of the brush 58 that is in column 1, is connected to latch 60 so as to turn it on and activate one leg of AND circuit 63. This occurred the last time this channel was used, for example on a previous form. At that time, the trigger was set on when the carriage stopped at the position indicated by a hole in the tape. Furthermore, as hereinafter will be further explained, stop brushes 58 also cooperate with magnets 118 and 119 to turn off valve 83. The other leg of AND circuit 63 is brought up by the leg connected to the first channel in the carriage decoder 50 which, for example, could represent a skip to 1. (For purposes of this invention skip to 1 means skip to the next hole punched in channel 1 on the tape 53.) Therefore when both legs of AND circuit 63 are conditioned, OR circuit 66 is brought up so as to act on driver 68 through AND circuit 65 which was conditioned by line 51 when end of printing occurred. Driver 68 energizes a skip magnet 70 which opens a high speed valve 81 to the hydraulic motor 80. Since both valves 81 and 83 are opened, the motor and carriage 19 will move at high speed. For purposes of this invention it is intended that both valves be opened to pass sufficient fluid to operate at high speed. With only valve 83 opened, the motor will operate at slow speed. Now if the motor is operating at high speed, then when an opening in a selected channel (for example channel 1) in the carriage control tape 53 passes one of the low speed brushes 56, the carriage is slowed down due to the fact that the trigger latch 60 is turned off so as to turn off one of the legs to the AND circuit 63. Therefore OR circuit 66 is brought down so as to turn off the driver 68 and magnet 70. Now when the output of OR circuit 66 is down, it turns on the output of inverter 67 so as to bring up driver 69 and energize skip stop magnet 71. Skip magnet 71 turns off valve 81 of the hydraulic motor and the motor therefore operates at low speed due to only valve 83 remaining open.

Now in order to stop the carriage after the carriage has been slowed down, stop brushes 58 are positioned from brushes 56, equivalent to a certain predetermined number of line spaces on the form, and latch 60 is turned on when the same hole previously read by brush 56 appears at brushes 58. This conditions one leg of AND circuit 84. The other leg of AND circuit 84 is connected to channel 1 of the carriage decoder, for example, the channel skip to 1, so as to bring up AND circuit 84. This brings up OR circuit 88 and OR circuit 90 to bring down trigger latch 112. This then brings down driver 116 and space start magnet 118. Now in order to close the hydraulic valve, trigger latch 112 being down brings up inverter 115 to turn on driver 117 to energize the stop magnet 119 to move the hydraulic valve 83 to its off position. The hydraulic motor 80 then stops to stop the carriage and paper tape.

In order to prevent skip magnet 70 from being reselected when a stop signal occurs through brushes 58, since the decoded line is still up from decoder 50, a single shot multivibrator 85 is provided in line 51 which through AND circuit 65 sets on latch 87 which initiates fast motion if, for example, latch 60 is on. At the time brushes 56 provide a signal, latch 60 is turned off and OR circuit 66 goes down, inverter 89 comes up setting off latch 87 so that the hydraulic motor will operate at low speed.

It was pointed out previously that the hydraulic motor 80, paper tape 53, high speed and low speed circuitry, and stop circuitry could be operated to activate valves 81 and 83 whenever a skip condition was to be performed. However if a spacing condition is to be performed, then only the valve 83 is activated to drive the carriage at low speed and the stopping of the carriage is controlled by a binary counter 102. Now in addition to skip conditions, the carriage control character can indicate by its configuration whether a single space, double space, triple space, or quadruple space is to be performed by the carriage. The carriage decoder 50 will decode the CCC to provide a signal to one of its several outputs.

The binary counter 102 is preset by a gating circuit 101 to the particular type of spacing that is to be performed by the carriage. For example, such an arrangement can be made according to the following table.

| | Counter 1 | Counter 2 |
|---|---|---|
| Single space | on | on. |
| Double space | off | on. |
| Triple space | on | off. |
| Quadruple space | off | off. |

Assuming a triple space is called for by the carriage control character, the carriage decoder will provide a signal to the gating circuit 101 which will produce an output to preset the space counter according to the above table. The carriage decoder will turn counter 102—1 on and counter 102—2 off. An emitter 100 is provided which is connected to the hydraulic motor 80 and is rotated in synchronism with it. The emitter operating in synchronism with the carriage indicates one pulse per line space on the form. The first pulse from the emitter turns counter 102—1 off and counter 102—2 on. The second pulse, which in the case of the carriage is now moved two spaces, turns counter 102—1 on and counter 102—2 stays on. This is a comparing indication to indicate that the carriage should stop. The mechanics of the carriage is such that it is not able to stop immediately and is timed such that the carriage coasts one additional space. Now since counter 102—1 and 102—2 are both on, AND circuit 106 is conditioned to bring up OR circuit 90. The output of OR circuit 90 resets latch 112 off to turn off driver 116 and space start magnet 118 so as not to operate on the hydraulic valve 83 of the hydraulic motor. Since latch 112 is off, inverter 115 will be turned on to bring up and activate driver 117 to energize space stop magnet 119 to turn valve 83 off. Shutting off the hydraulic motor will then stop the carriage at its next print position as indicated by the carriage control character which for purposes of this description was indicated as a triple space. The following is a description of the intended operation of the carriage control by reference to an example.

Let it be assumed that the carriage has just moved the forms to line 20 to print $IR_1$. When the carriage stopped at line 20, a signal is generated by the driver 117 on line 44 to condition one leg of the AND circuits 34, the other being conditioned by the $CCC_2$ in the inactive register 24. Simultaneously printer circuitry 16 receives a signal from line 44 and if all of the $IR_1$ information has been stored in storage 14, printer circuitry will be activated to start the printing operation.

At the end of printing $IR_1$ on line 20, $CCC_2$ is the carriage control character in the active register 36. Assume that a hole in channel 2 of paper tape 53 represents the next position of the carriage which is to be line 30 on the form. The signal representing $CCC_2$ will bring up OR circuit 46 to condition one leg of AND circuit 48. At the end of printing $IR_1$ on line 20, a signal is generated by the printer circuitry 16 to condition the other leg of AND circuit 48. The output signal of AND 48, which is a carriage "go" signal, brings up line 51 which activates the circuit latch 112, driver 116 and space magnet 118 to start the hydraulic motor 80, thereby starting carriage motion. The output of AND 48 on line 51 simultaneously conditions one leg of AND circuit 65. The other leg of 65 is conditioned when the decoder 50 provides an output, for example, at skip to 2. Skip to 2 output being up, brings up one leg of AND circuit 64.

Since the printing took place at line 20 and the $CCC_2$ indicates that channel 2 should control the carriage stopping, and assuming we are to move to line 30, then a hole that is prepunched in the tape will now be positioned the equivalent of ten line spaces ahead of stop brush 58. Brushes 56 are permanently located eight line spaces ahead of brushes 58. It therefore follows that the tape must move two line spaces before the hole will be sensed by brush 56. Therefore AND circuit 65 will be completed since latch 62 is in an "on" state since during a previous operation a hole in this channel passed brush 58. Since AND 65 is up, driver 68 is up energizing skip start magnet 70 and therefore opening valve 81. Since both valves are open, the carriage will move at high speed for two line spaces at which time brush 56 will sense the hole. This will turn off trigger latch 62 so as to bring down AND 64, OR 66, AND 65, driver 68, and de-energize skip start magnet 70. AND circuit being down will bring the output of inverter 67 to bring driver 69 up and energize skip stop magnet 71 to close hydraulic valve 81. The hydraulic motor therefore will operate at low speed under control of valve 83.

Simultaneously with movement of the carriage to its line 30 position, the pulse on line 49 from the printer circuitry 16 provides a signal to the tape adapter unit 13 to begin moving the magnetic tape forward and to read $CCC_3$ and the unrelated recorded data $IR_2$ as picked up by the reading heads 12. As mentioned previously the magnetic tape 10 will have been returned to the beginning and has remained there until completion of printing of $IR_2$.

The starting of the forward motion of the tape produces a pulse on line 39 from the tape adapter unit 13, which through a single shot multivibrator causes record mark counter 18 to reset to 1. Line 39 also through another single shot multivibrator 37 causes inactive register 24 to be reset and cleared. Now since scan counter 21 registered a count of 1 during the first scan, and advanced to a count of 2 as the tape backspaced, it is now setting at 2 throughout the present scan. Therefore, comparing unit 22 will not sense a comparison between counters 18 and 21 until one record mark has pulsed the record mark counter 18. When the same count appears in both counters, line 27 will be up causing trigger $T_1$ to switch to state "1" bringing one leg of AND circuit 23 up, and the other leg being also conditioned by line 27 permits AND circuit 23 to condition the inactive register 24 to accept $CCC_3$. The $CCC_3$ will provide an output from register 24 to OR circuit 30, through delay unit 25 to switch trigger $T_1$ to its "0" state. Trigger $T_1$ being in a "0" state brings down AND circuit 23 to prevent following data from entering register 24. The switching of $T_1$ to the "0" state provides an output to one leg of AND circuit 31, the other leg being conditioned by line 27. AND circuit 31 therefore conditions IR storage 14 to accept $IR_2$.

When the RM following $IR_2$ on the tape is sensed, a pulse is produced on line 15 to cause the record mark counter to advance to a count of 3, thereby resulting in unequal count in the counters 18 and 21 to bring down the output of comparing unit 22. This brings down line 27 and one leg of AND circuit 31 to prevent further entry of any following data into IR storage unit 14. Now the $IR_2$ information is stored and ready to be called for by the printer circuitry 16 when the carriage has stopped moving to line 30 as represented by $CCC_2$ and channel 2 on the tape 53.

In order to stop the hydraulic motor 80 and therefore the paper tape 53 and carriage 19 at line 30, a signal is picked up by the brushes 58 when the opening of channel 2 selected by $CCC_2$ arrives at the stop brushes 58. This brings up one leg of AND circuit 86. The other leg of AND circuit 86 is brought up by being connected to the output skip to 2 on carriage decoder 50. AND circuit 86 being up brings up OR circuit 88, also OR circuit 90, to turn trigger latch 112 to its state "0" condition. This brings down driver 116 to de-energize space magnet 118. Now since the valve 83 must be turned to its off position, latch 112 being in state "0" brings up inverter 115 which brings up driver 117 to energize the space stop magnet 119 and thereby shift the hydraulic valve 83 to its off position. When the hydraulic motor is stopped, the carriage 19 will also stop. Now the carriage should be sitting at line 30 ready to receive printing. Also it is noted that since the opening in channel 2 has arrived at stop brushes 58, latch 62 will be turned to its on position to condition one leg of AND 65 for subsequent operation of the motor. Now when driver 117 went on to stop the carriage, it emitted a signal on line 44 which resets active register 36, to clear the $CCC_2$. The same signal also acts through a delay 43 to AND circuits 34 so as to shift the $CCC_3$ from the inactive register 24 to the active register 36. Now the cycle is ready to repeat.

While the invention has been particularly shown and described with reference to a preferred embodiment thereof, it will be understood by those skilled in the art that various changes in form and details may be made therein without departing from the spirit and scope of the invention.

What is claimed is:

1. A control for the carriage of a business accounting machine comprising, a record information means containing information to be printed, sensing means to read the record to be printed, said record information means also containing a carriage control character related to a following record to be printed, an inactive carriage control character register for storing the carriage control character relating to the following record to be printed, printing means to print the record to be printed, an active carriage control character register conditioned in response to a start print signal to receive the carriage control character signal from the inactive register, a print circuit indicating a signal when printing of a record is complete, and carriage circuit control means responsive to the end of print signal for moving the carriage to its next stop position as indicated by the carriage control character in the active register simultaneously with the sensing of an unrelated carriage control character and a record to be printed.

2. Record source means which includes a series of records containing representations to be printed on business forms, and which also includes carriage control characters associated with each of the records to indicate where the record is to be printed on the business forms, sensing means for sensing the representations on the record source means, and means for substantially simultaneously calling for a record to be printed and the carriage control character associated with the next record, so that when a line of print is finished, the carriage can be advanced to its new position and the information to be printed at this postion can be simultaneously called for from the record source means.

3. The combination as in claim 2 wherein the means for calling for a record to be printed and a carriage control character associated with another record to be printed includes register means for storing the carriage control character while the record is being printed, and means to gate the carriage control character into an active register for moving the carriage immediately upon completion of the printing so that the carriage can be moved while the sensing means is sensing the representations associated with the carriage control character.

4. A control for a carriage for use in a business machine comprising a tape containing carriage control character data and data to be printed, sensing means for reading the carriage control character data with unrelated data to be printed, carriage control character register means for storing the carriage control character, storage means for storing the data to be printed, and record selection control circuits for selectively activating said carriage control character register means and said storage means, the record selection control circuits controlling movement of the tape and selective gating of the next record.

5. A control for a carriage for use in a business machine comprising a tape containing carriage control character data and data to be printed, sensing means for reading the carriage control character data with unrelated data to be printed, carriage control character register means for storing the carriage control character, storage means for storing the data to be printed, and record selection control circuits for sequentially activating said carriage control character register means and said storage means, the record selection control circuits including counter circuits for controlling movement of the tape in a forward or reverse direction.

6. A control for a carriage for use in a business machine comprising a tape containing carriage control character data and data to be printed, sensing means for reading the carriage control character data with unrelated data to be printed, carriage control character register means for storing the carriage control character, storage means for storing the data to be printed, record selection control circuits sequentially activating the carriage control character register means and storage means, and comparing circuit means in the record selection control circuits to control movement of the tape in a forward or reverse direction.

7. A control for a carriage for use in a business machine comprising a tape containing groups of records, each group of records being separated by a gap and containing at least one record, carriage control character data and data to be printed forming a record to be sensed, sensing means for sensing the record to be sensed, and record selection control circuits controlling sensing one record at a time and controlling sequential storing of the carriage control character data and data to be printed.

8. A control for a carriage for use in business machines comprising a tape containing groups of records, each group of records being separated by a gap with each group containing a plurality of records, carriage control character data and data to be printed forming a record to be sensed, sensing means for sensing the record to be sensed, record selection control circuits controlling sensing one record at a time and controlling sensing a carriage control character data unrelated to the data to be printed, and means for controlling sequential storing of the carriage control character data and data to be printed.

9. A control for a carriage for use in business machines comprising a tape containing groups of records, each group of records being separated by a gap with each group containing a plurality of records, carriage control character data and data to be printed forming a record to be sensed, sensing means for sensing the records, the last carriage control character of a group of records being related to the data to be printed in the first record of the next group, record selection control circuits controlling sensing one record at a time and controlling sensing a carriage control character data unrelated to the data to be printed, and means for controlling sequential storing of the carriage control character data and data to be printed.

10. In a business machine having a carriage for moving business forms, a control for said carriage, comprising a tape containing groups of records, each group of records being separated by a gap with each group containing a plurality of records, the last carriage control character of a group of records being related to the data in the first record of the next group that is to be printed, sensing means for sensing the records, record selection control circuits for controlling selective sensing of one record during a forward scan of a group of records, register means for storing the carriage control character, the record selection control circuits sequentially conditioning the register means to receive the carriage control character and the storage unit to receive the data to be printed, means for reversing the motion of the tape if there are still further records to be sensed, carriage stop signal means for indicating a signal when the carriage has stopped at the next print position to shift the carriage control character in the register means, printer circuitry responsive to the same signal to start printing data unrelated to the carriage control character in the register means, carriage start means responsive to an end of print signal to move the carriage upon completion of printing to the position indicated by the carriage control character in the register means, tape start means simultaneously responsive to the end of print signal to start moving the tape, and forward drive indication means in the selection control circuits for controlling the time for sensing the next record in sequence and to gate the data to be printed into a storage unit for activating the printer circuitry upon receiving the carriage stop signal to start printing the data just read from the tape.

References Cited in the file of this patent

UNITED STATES PATENTS

| | | |
|---|---|---|
| 2,531,885 | Mills et al. | Nov. 28, 1950 |
| 2,880,838 | Panissidi | Apr. 7, 1959 |